(12) United States Patent
McAlister (10) Patent No.: US 8,617,260 B2
(45) Date of Patent: *Dec. 31, 2013

(54) MULTI-PURPOSE RENEWABLE FUEL FOR ISOLATING CONTAMINANTS AND STORING ENERGY

(75) Inventor: Roy Edward McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/311,434

(22) Filed: Dec. 5, 2011

(65) Prior Publication Data
US 2012/0167456 A1 Jul. 5, 2012

Related U.S. Application Data (63) Continuation of application No. 13/027,197, filed on Feb. 14, 2011, now Pat. No. 8,070,835.

(60) Provisional application No. 61/304,403, filed on Feb. 13, 2010, provisional application No. 61/421,189, filed on Dec. 8, 2010.

(51) Int. Cl.
*C12P 7/14* (2006.01)
*C12P 5/00* (2006.01)
*C10L 1/02* (2006.01)

(52) U.S. Cl.
USPC .............. 44/300; 44/628; 435/167; 518/705; 568/910

(58) Field of Classification Search
USPC ............. 44/300, 628; 568/910; 435/162–167; 518/700–704
See application file for complete search history.

(56) References Cited

U.S. PATENT DOCUMENTS

| 4,367,206 A | 1/1983 | Pinto |
| 4,424,118 A | 1/1984 | Rankel |

(Continued)

FOREIGN PATENT DOCUMENTS

| GB | 2086416 A | 5/1982 |
| JP | 2000-140621 A | 5/2000 |

(Continued)

OTHER PUBLICATIONS

Dolan, Eric. "Device uses sunlight to make liquid fuel". *The Raw Story*. Published: Dec. 24, 2010. 3 pages.

(Continued)

*Primary Examiner* — Pamela H Weiss
(74) *Attorney, Agent, or Firm* — Perkins Coie LLP (57) ABSTRACT

Techniques, systems, apparatus and material are disclosed for generating multi-purpose $H_2$-dense fuel for isolating contaminants and storing energy. In one aspect, a method of producing a renewable multi-purpose biomaterial for isolating a hazardous contaminant from an environment and storing energy includes dissociating biomass waste using a thermochemical reaction to produce at least one of hydrocarbon and alcohol by applying waste heat recovered from an external heat source. The method includes dissociating the at least one of hydrocarbon and alcohol to generate carbon and hydrogen. Carbon dioxide emitted from an industrial process is harvested and reacted with the hydrogen to generate the hydrogen-dense fuel. A hazardous contaminant is dissolved in the hydrogen-dense fuel operating as a solvent to generate a liquid mixture that isolates the hazardous contaminant from the environment. The hazardous contaminant includes at least one of a carbon donor and a hydrogen donor.

20 Claims, 8 Drawing Sheets

(56) References Cited

U.S. PATENT DOCUMENTS

| | | | |
|---|---|---|---|
| 4,906,302 | A | 3/1990 | Bruya |
| 5,059,303 | A | 10/1991 | Taylor et al. |
| 6,673,742 | B2 | 1/2004 | Abdo et al. |
| 8,070,835 | B2 * | 12/2011 | McAlister .................. 44/300 |
| 2003/0062270 | A1 | 4/2003 | McAlister |
| 2003/0196810 | A1 | 10/2003 | Vinegar et al. |
| 2007/0137246 | A1 | 6/2007 | McKellar et al. |
| 2007/0298478 | A1 * | 12/2007 | Offerman et al. ............ 435/167 |
| 2009/0286890 | A1 | 11/2009 | Joshi et al. |
| 2009/0289227 | A1 * | 11/2009 | Rising .......................... 252/373 |
| 2009/0318572 | A1 | 12/2009 | Sakai et al. |

FOREIGN PATENT DOCUMENTS

| | | |
|---|---|---|
| JP | 2002-193858 A | 7/2002 |
| JP | 2003-510403 | 3/2003 |
| JP | 2005-075925 | 3/2005 |
| JP | 2005-289856 | 10/2005 |
| JP | 2008-537956 | 10/2008 |
| JP | 2009-242248 | 10/2009 |
| WO | WO-2004-092055 | 10/2004 |
| WO | WO-2005-033250 | 4/2005 |
| WO | WO-2010078035 A2 | 7/2010 |

OTHER PUBLICATIONS

Lee et al. "Biological Hydrogen Production: Prospects and Challenges". *Trends in Biotechnology* 28.5. Jan. 2010. 10 pages.

Deluga et al. "AviationBioguels: Hydrotreated Renewable Jet," General Electric. Presentation Dated: Feb. 23, 2010. 13 pages.

International Search Report and Written Opinion for Application No. PCT/US2011/024799 Applicant: McAlister Technologies, LLC; Date of Mailing: Oct. 18, 2011 (9 pages).

International Search Report and Written Opinion for Application No. PCT/US2011/24812 Applicant: McAlister Technologies, LLC; Date of Mailing: Oct. 26, 2011 (12 pages).

Lopez et al., "Performance of the Southern California Edison Company Stirling Dish," Contractor Report, Prepared by Sandia National Laboratories Albuquerque, New Mexico, California, Printed Oct. 1993, 213 pages.

International Search Report and Written Opinion for Application No. PCT/US2012/050656 Applicant: McAlister Technologies, LLC; Date of Mailing Feb. 26, 2013 (10 pages).

* cited by examiner

MULTI-PURPOSE RENEWABLE FUEL FOR ISOLATING CONTAMINANTS AND STORING ENERGY

CLAIM OF PRIORITY

The present application is a continuation of U.S. patent application Ser. No. 13/027,197, filed Feb. 14, 2011 and titled MULTI-PURPOSE RENEWABLE FUEL FOR ISOLATING CONTAMINANTS AND STORING ENERGY, which claims priority to and the benefit of U.S. Patent Application No. 61/304,403, filed on Feb. 13, 2010 and titled FULL SPECTRUM ENERGY AND RESOURCE INDEPENDENCE, and U.S. Patent Application No. 61/421,189, filed on Dec. 8, 2010 and titled LIQUID FUELS FROM HYDROGEN, OXIDES OF CARBON, AND/OR NITROGEN; AND PRODUCTION OF CARBON FOR MANUFACTURING DURABLE GOODS. Each of these applications is incorporated herein by reference in its entirety. To the extent the foregoing application and/or any other materials incorporated herein by reference conflict with the disclosure presented herein, the disclosure herein controls.

BACKGROUND

This application relates to devices, techniques and materials related to biofuels.

The Industrial Revolution has produced the infrastructure, mechanized equipment, appliances, and communications systems to stimulate civilization's 7 billion people to burn more than one million years' of fossil coal, oil, natural gas, and shale accumulations each year. In additional, the global-scale participation in the Industrial Revolution has produced interrelated problems of finite resource depletion and economic inflation; loss of productivity due to diseases that are initiated or exasperated by air, water, and soil pollution; lack of confidence to adopt the work ethic required for long-term achievements; and global warming that threatens to trigger more severe climate changes by releasing methane and other greenhouse gases from previously frozen soils, melting ice packs, and anaerobic processes in sediments on ocean floors, rivers, lakes, and riparian areas.

SUMMARY

Techniques, structures, apparatus and materials are disclosed for generating hydrogen ($H_2$)-dense intermediaries that are storable and transportable. Also, the $H_2$-dense intermediaries can be used as solvents for isolating and removing hazardous materials.

In one aspect, a method of producing a renewable multipurpose biomaterial for isolating a hazardous contaminant from an environment and storing energy includes dissociating biomass waste using an anaerobic reaction to produce at least one of hydrocarbon and alcohol by applying waste heat recovered from an external heat source. The at least one of hydrocarbon and alcohol is dissociated to generate carbon and hydrogen. Carbon dioxide emitted from an industrial process is harvested. The harvested carbon dioxide is reacted with the hydrogen to generate the hydrogen-dense intermediary. A hazardous contaminant is dissolved in the hydrogen-dense intermediary operating as a solvent to generate a liquid mixture that isolates the hazardous contaminant from the environment, wherein the hazardous contaminant including at least one of a carbon donor, a nitrogen donor and a hydrogen donor.

Implementations can optionally include one or more of the following features. The method can include applying to the liquid mixture, waste heat recovered from the external heat source or another external heat source to generate a renewable fuel mixture with a ratio of hydrogen to carbon that is higher than the hydrocarbon and the alcohol produced from the biomass waste dissociation. The method can include dissociating the hydrogen-dense intermediary in the presence of waste heat recovered from the external heat source or another external heat source to produce high specific energy hydrogen and carbon monoxide. The hydrogen-dense intermediary can include at least one of hydrocarbon, alcohol and ammonia. The hydrocarbon can include methane, and the alcohol can include methanol. The method can include transporting the hydrogen-dense intermediary to a remote location before applying waste heat recovered from the external heat source or another external heat source to produce high specific energy hydrogen and carbon monoxide. The method can include transporting the liquid mixture to a remote location before applying waste heat recovered from the external heat source or another external heat source to produce high specific energy hydrogen and carbon monoxide. Dissociating the biomass waste can include producing hydrogen in addition to the hydrocarbon and alcohol. Dissociating the biomass waste can include producing one or more carbon donors in addition to the hydrocarbon and alcohol. The method can include reacting the one or more carbon donors with the hydrogen produced from the biomass waste to generate hydrogen-dense alcohol. The method can include reacting the one or more carbon donors with water to generate additional alcohol. The hazardous contaminant can include at least one of colloidal carbon, fat, carbohydrate, sugar, rejected waste material from a polymer plant, carbon dioxide from exhaust of an industrial process, dust from coal, dust from grain, dust from polymer processing, and distilled solids from ethanol plant waste stream. The method can include filtering out at least one of a halogen and a carcinogen from the contaminants. The biomass waste dissociation can produce wet alcohol that reduces the availability of ethanol. The wet alcohol can be used as a solvent to dissolve a hazardous contaminant to generate a liquid mixture that isolates the hazardous contaminant from the environment. The hazardous contaminant can include at least one of a carbon donor, a nitrogen donor and a hydrogen donor.

In another aspect, an energy-dense liquid mixture that reduces vapor pressure or availability of the vapor pressure of a previously hazardous contaminant is produced by a method that includes dissociating biomass waste using an aerobic reaction to produce at least one of hydrocarbon and alcohol by applying waste heat recovered from an external heat source. The at least one of hydrocarbon and alcohol is dissociated to generate carbon and hydrogen. Carbon dioxide emitted from an industrial process is harvested. The harvested carbon dioxide is reacted with the hydrogen to generate the hydrogen-dense intermediary or fuel. A hazardous contaminant is dissolced in the hydrogen-dense fuel operating as a solvent to generate the liquid mixture that isolates the hazardous contaminant from the environment. The hazardous contaminant can include at least one of a carbon donor and a hydrogen donor. The liquid mixture can be produced by the method that includes applying to the liquid mixture, waste heat recovered from the external heat source or another external heat source to generate a renewable fuel mixture with a ratio of hydrogen to carbon that is higher than the hydrocarbon and the alcohol produced from the biomass waste dissociation. The energy-dense liquid mixture can be produced by the method that includes dissociating the hydrogen-dense intermediary in the presence of waste heat recovered from the external heat source or another external heat source to produce high specific energy hydrogen and carbon monoxide. The hydrogen-dense intermediary or fuel can include at least one of hydrocarbon, alcohol and ammonia. The hydrocarbon can include methane, and the alcohol can include methanol. The energy-dense liquid mixture can be produced by the method that further includes transporting the hydrogen-dense intermediary to a remote location before applying waste heat recovered from the external heat source or another external heat source to produce high specific energy hydrogen and carbon monoxide. The energy-dense liquid mixture can be produced by the method that further includes transporting the liquid mixture to a remote location before applying waste heat recovered from the external heat source or another external heat source to produce high specific energy hydrogen and carbon monoxide. The energy-dense liquid mixture of claim can be produced by the process where dissociating the biomass waste includes producing hydrogen in addition to the hydrocarbon and alcohol. The energy-dense liquid mixture can be produced by the method that includes dissociating the biomass waste, which includes producing one or more carbon donors in addition to the hydrocarbon and alcohol. The energy-dense liquid mixture can be produced by the method that includes reacting the one or more carbon donors with the hydrogen produced from the biomass waste to generate hydrogen-dense alcohol. The energy-dense liquid mixture can be produced by the method that includes reacting the one or more carbon donors with water to generate additional alcohol. The hazardous contaminant can include at least one of colloidal carbon, fat, carbohydrate, sugar, rejected waste material from a polymer plant, carbon dioxide from exhaust of an industrial process, dust from coal, dust from grain, dust from polymer processing, and distilled solids from ethanol plant waste stream. The energy-dense liquid mixture can be produced by a process that includes filtering at least one of a halogen and a carcinogen is filtered out from the contaminants.

The subject matter described in this specification potentially can provide one or more of the following advantages. For example, the low specific energy $H_2$ left over from the dissociation of the biomass produced hydrocarbons, alcohol, etc. can be repurposed along with carbon donors (e.g., carbon dioxide and carbon monoxide) from industrial pollution to create hydrogen dense fuel with high specific energy hydrogen. In addition, the hydrogen dense fuel can be used as a solvent for dissolving dangerous contaminants to generate a liquid mixture, which is also a precursor to renewable fuel. By dissolving the contaminants in the $H_2$-dense fuel, the harmful effects of the contaminants can be isolated from the environment and at the same time, the liquid mixture can be dissociated in an endothermic reaction to generate renewable fuel.

BRIEF DESCRIPTION OF THE DRAWINGS

Like reference symbols and designations in the various drawings indicate like elements.

DETAILED DESCRIPTION

Techniques, structures, apparatus and materials are disclosed for, generating hydrogen ($H_2$)-dense intermediaries that are storable, transportable and consumable as renewable fuels. Also, the $H_2$-dense intermediaries can be used as solvents for isolating and removing hazardous contaminants.

Increasing Density of Hydrogen Fuel for Isolating and Removing Contaminants

Lignin, cellulose, or other biomass waste feedstock dissociated under a thermochemical reaction can produce a mixture of useful renewable materials, such as hydrocarbons, alcohols, ammonia, hydrogen and oxides of carbon. A copending U.S. patent application entitled "CARBON-BASED DURABLE GOODS AND RENEWABLE FUEL FROM BIOMASS WASTE DISSOCIATION" describes the techniques and systems for biomass waste dissociation, the entire contents of which are incorporated by reference. Briefly, Equation 1 below shows an example process for biomass waste dissociation.

$$C_xH_yO_z + HEAT \rightarrow CH_4 + H_2 + CO_2 + CO \qquad \text{Equation 1}$$

Using the process described in Equation 1, virtually any organic material can be converted in large part to hydrocarbon fuel, such as methane ($CH_4$) for distribution and storage in the existing natural gas infrastructure. Equation 2 below illustrates a general summary of the overall reactions for production of methane from typical biomass wastes such as glucose, lignin, and cellulosic feedstocks.

$$C_6H_{12}O_6 + HEAT \rightarrow 3CH_4 + 3CO_2 \qquad \text{Equation 2}$$

In some implementations, the biomass dissociation reaction can produce alcohols, such as methanol as a readily storable and transportable liquid fuel and chemical precursor. Methanol or "wood alcohol" can be extracted by heating lignocellulosic wastes through partial combustion or by anaerobic heating processes. Equations 3 and 4 summarize the output of methanol that can be achieved by selection of different anaerobic operating temperatures, pressures, and catalysts.

$$C_6H_{12}O_6 + HEAT \rightarrow 6CO + 6H_2 \qquad \text{Equation 3}$$

$$6CO + 6H_2 \rightarrow 3CH_3OH + 3CO \qquad \text{Equation 4}$$

At higher feed rates and/or lower heat release rates in a reactor, the charge does not reach the higher temperatures that produce the gases shown in Equation 1, and thus the dissociation process produces alcohol, such as methanol. Carbon monoxide can be separated from methanol by cooling the methanol vapors to form liquid methanol and to utilize the separated carbon monoxide to fuel a combustible engine, to release heat through combustion by a burner assembly, and to form hydrogen by a reaction with water as summarized in Equation 5. Hydrogen produced by the reaction summarized in Equation 5 may be used to produce methanol as shown in Equation 4, to improve operation of an engine, to improve the yield of methane and/or ethane in the biomass conversion and/or as a heating fuel.

$$CO+H_2O \rightarrow H_2+CO_2 \quad \text{Equation 5}$$

The hydrocarbons and alcohols produced from the biomass waste dissociation can be further dissociated to generate carbon and low specific energy $H_2$. Equation 6 illustrates a general process of dissociating hydrocarbon fuel to obtain hydrogen and carbon. Equation 7 shows a specific reaction for dissociation of methane into carbon and hydrogen.

$$C_xH_y + HEAT_4 \rightarrow XC + 0.5YH_2 \quad \text{Equation 6}$$

$$CH4 + \Delta H_{298K} \rightarrow 2H_2 + C(\Delta H_{298K} = 79.4 \text{ kJ/mol}) \quad \text{Equation 7}$$

Equation 8 shows a reaction for dissociating cellulose and fuel alcohols that contain oxygen by anaerobic decomposition to obtain carbon, carbon monoxide and hydrogen.

$$C_2H_5OH + HEAT \rightarrow C + CO + 3H_2 \quad \text{Equation 8}$$

The generated carbon can be used in production of carbon-based durable goods, such as the materials used to produce various equipments used in wind power generator, solar power generator, etc.

The low specific energy $H_2$ collected from dissociating the alcohols, such as methanol and hydrocarbons, such as methane can be used to produce a hydrogen-dense fuel or intermediary that has multiple applications. In one aspect, a high specific energy $H_2$ fuel can be generated by reacting the low specific energy $H_2$ with a carbon donor, such as $CO_2$ or Co harvested and repurposed or recycled from an industrial process (e.g., pollution.)

In addition, $H_2$ can be obtained by any other energy induced dissociations including electrolysis of anaerobically developed acids and liquors from organic digestion processes and from water as generally shown in Equation 9.

$$H_2O + ENERGY \rightarrow 0.5O_2 + H_2 \quad \text{Equation 9}$$

Pressurized hydrogen or pressurized and heated hydrogen such as may be produced by the pressurizing processes shown in Equations 1, 3, 5, and or 8 can be added to pressurize carbon donor to form a desired compound such as DME fuel or methanol.

Figure 1:
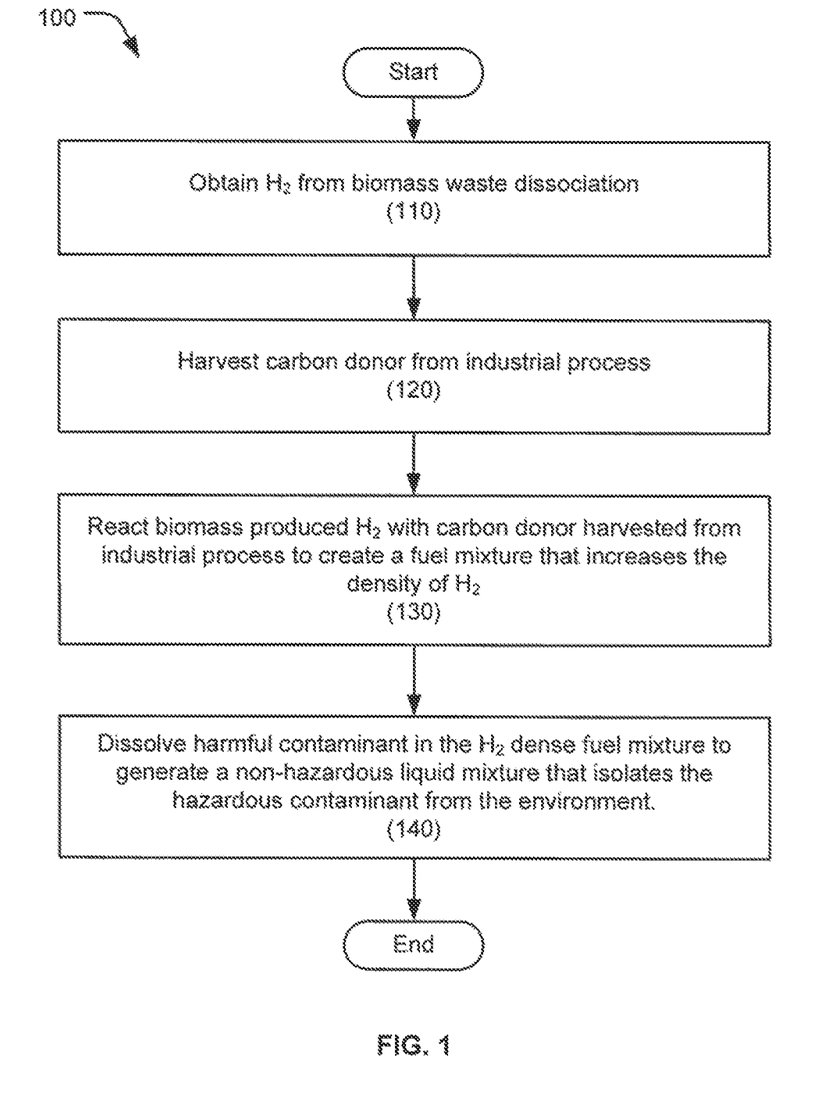
FIG. 1 is a process flow diagram showing an exemplary process for generating high specific energy $H_2$-dense fuel from biomass waste generated $H_2$ and recycled carbon donor.

FIG. 1 is a process flow diagram showing an exemplary process 100 for generating high specific energy $H_2$-dense fuel from biomass waste generated $H_2$ and recycled carbon donor. A system (e.g., system 400 below) can obtain $H_2$ from products of biomass waste dissociation (110). As described above, low specific $H_2$ can be obtained as a result of dissociating hydrocarbons and/or alcohols produced from the biomass dissociation. Also, the system can harvest a carbon donor, such as $CO_2$ or CO from an industrial process (120). The carbon donor harvested can include $CO_2$ and CO emitted as pollution from central power plants, coking, and calcining operations that burn hydrocarbons, breweries, and bakeries. The low specific energy $H_2$ from biomass waste dissociation is reacted with the harvested carbon donor to generate a fuel mixture that increases the density of $H_2$ (130).

For example, hydrogen from suitable sources including production summarized by Equations 1-9 may be reacted with an oxide of carbon to produce various fuels that may be easily stored, transported and utilized types including methanol as illustratively shown in Equations 10 and 11 below.

$$CO + 2H_2 \rightarrow CH_3OH \; (\Delta H = -21.66 \text{ Kcal/g-mol}) \quad \text{Equation 10}$$

$$CO_2 + 3H_2 \rightarrow CH_3OH + H_2O (\Delta H = -11.83 \text{ Kcal/g-mol}) \quad \text{Equation 11}$$

The process of Equation 11 can be accomplished by liquid phase methanol slurry catalysts at about 250° F. (120° C.) at favorable rates to produce inexpensive methanol.

In some implementations, catalysts can be added to the processes of Equations 10 and 11 to enhance the actions of hydrogen. Catalysts for the processes of Equations 10 and 11 include copper-zinc-oxide and deposited sinter mixture of copper and copper-zinc oxide at various process synthesis conditions including about 260° C. (500° F.) and 1500 psi to produce methanol or methanol and water as shown. Alternatively, dimethyl ether (DME) or ethylene or propylene may be produced depending upon the pressure, temperature and catalysts chosen.

The methanol and water solution produced by the process summarized by Equations 10 and 11 can serve as a solvent for soluble organics that are functional hydrogen and carbon donors. The soluble organics can include various harmful contaminants that contain soluble carbons (e.g., almost all food-processing wastes material, such as fat, carbohydrate and sugar), colloidal carbons, reject materials from industrial processes (e.g., reject materials from a polymer plant not recycled back into creating polymer), paper processing wastes, grain dust, molasses residues, bagas, and various residues of the fossil fuel industry including coal dust, refinery coke, and tar wastes, etc. that are depicted as "C" in the process shown in Equation 12.

$$CH_3OH + H_2O + C + HEAT \rightarrow 2CO + 3H_2 \quad \text{Equation 12}$$

As shown in Equation 12, the hydrogen-dense fuel is used as a solvent to dissolve the harmful contaminant to generate a liquid mixture that isolates the hazardous contaminant from the environment (140). The addition of the soluble organics can increase the ability to use waste by increasing the endothermic heat in producing carbon monoxide (CO) and hydrogen ($H_2$) as described below with respect to FIG. 6 below. The liquid mixture can be stored and/or transported to different location before being reacted in an endothermic reaction to generate the high $H_2$-dense fuel.

The soluble organics harvested from contaminants can include just carbon and water, which can be reacted with the hydrogen-dense fuel to obtain CO and high specific energy $H_2$ in an endothermic process. Moreover, the soluble organics can include hydrogen and carbon donors that raise the hydrogen to carbon ratio in the fuel mixture created. Higher the hydrogen to carbon ratio (hydrogen-dense), faster the burn of the fuel and the lower the $CO_2$ produced.

Thus, the described techniques allows the use of harmful contaminants that otherwise would be released to the environment, to be isolated to remove their harmful effects.

In addition, any halogens or carcinogens present in the contaminants can be filtered out. For example, the halogens or carcinogens can be reacted with another compound in the contaminants, such as exhaust fumes to create salts, such as chlorine into NaCl. Also any sulfur oxides present can be filtered out by precipitating with calcium to generate calcium sulfate, for example. Sulfur can be reacted with iron to generate iron sulfide, which can be used as nutrients.

Figure 2:
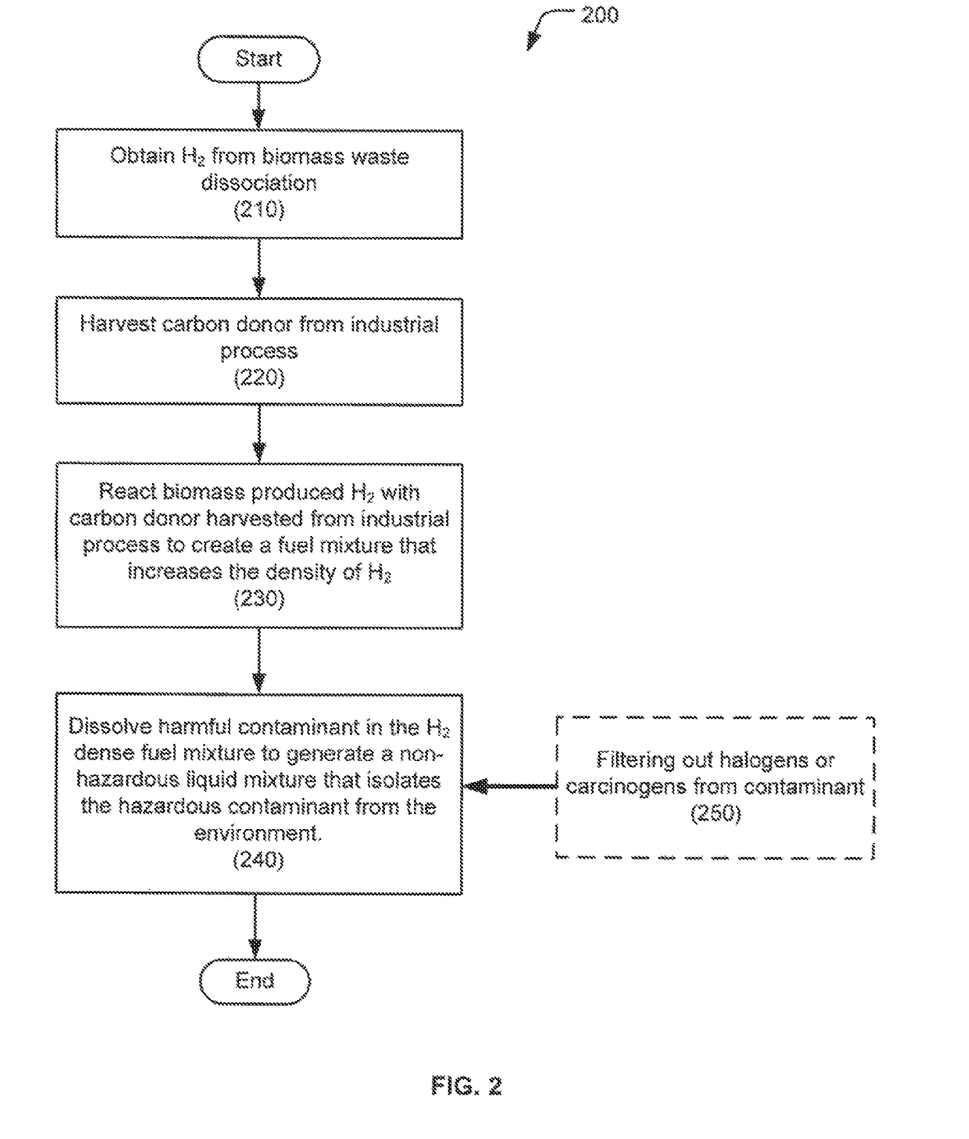
FIG. 2 is a process flow diagram of another process for isolating harmful contaminants using a hydrogen-dense fuel.

FIG. 2 is a process flow diagram of another process 200 for isolating harmful contaminants using a hydrogen-dense fuel. Process 200 is similar to the process 100 except that process 200 includes the additional processing of filtering out halogens and carcinogens from the hydrogen-dense fuel (see process 250). Specifically, a system (e.g., system 500 below) can obtain $H_2$ from products of biomass waste dissociation (210). As described above, low specific $H_2$ can be obtained as a result of dissociating hydrocarbons and/or alcohols produced from the biomass dissociation. Also, the system can harvest a carbon donor, such as $CO_2$ or CO from an industrial process (220). The carbon donor harvested can include $CO_2$ and CO emitted as pollution from central power plants, coking, and calcining operations that burn hydrocarbons, breweries, and bakeries. The low specific energy $H_2$ from biomass waste dissociation is reacted with the harvested carbon donor to generate a fuel mixture that increases the density of $H_2$ (230). As shown in Equation 12 ($CH_3OH+H_2O+C+HEAT \rightarrow 2CO+3H_2$), the hydrogen-dense fuel can be used as a solvent to dissolve the harmful contaminant to generate a liquid mixture that isolates the hazardous contaminant from the environment (240). The system can filter out halogens and carcinogens from the hydrogen-dense fuel using above described techniques (250).

The described techniques, apparatus and system readily accepts solutions of water and fuels including oxygenated constituents for purposes including reduced fuel production cost by avoiding the equipment and energy expenses required to produce and store water-free fuels. Also, the described techniques can reduce toxicity by reducing or eliminating the concentration gradient between water solutions within living cells and the fuel-water solution. Moreover, the described techniques can facilitate beneficial thermochemical regeneration production of more energetic and faster burning hydrogen-characterized fuels as summarized in Equation 12. As described above, carbon for this purpose may also be delivered and donated by utilizing condensable liquid fuel constituents such as methanol as a process vehicle to safely and gainfully dispose of objectionable or waste substances such as grain dust, coal dust, polymer fumes, tire dust, diesel soot, paint fumes, cutting fluids, and cooking fumes.

Figure 3:
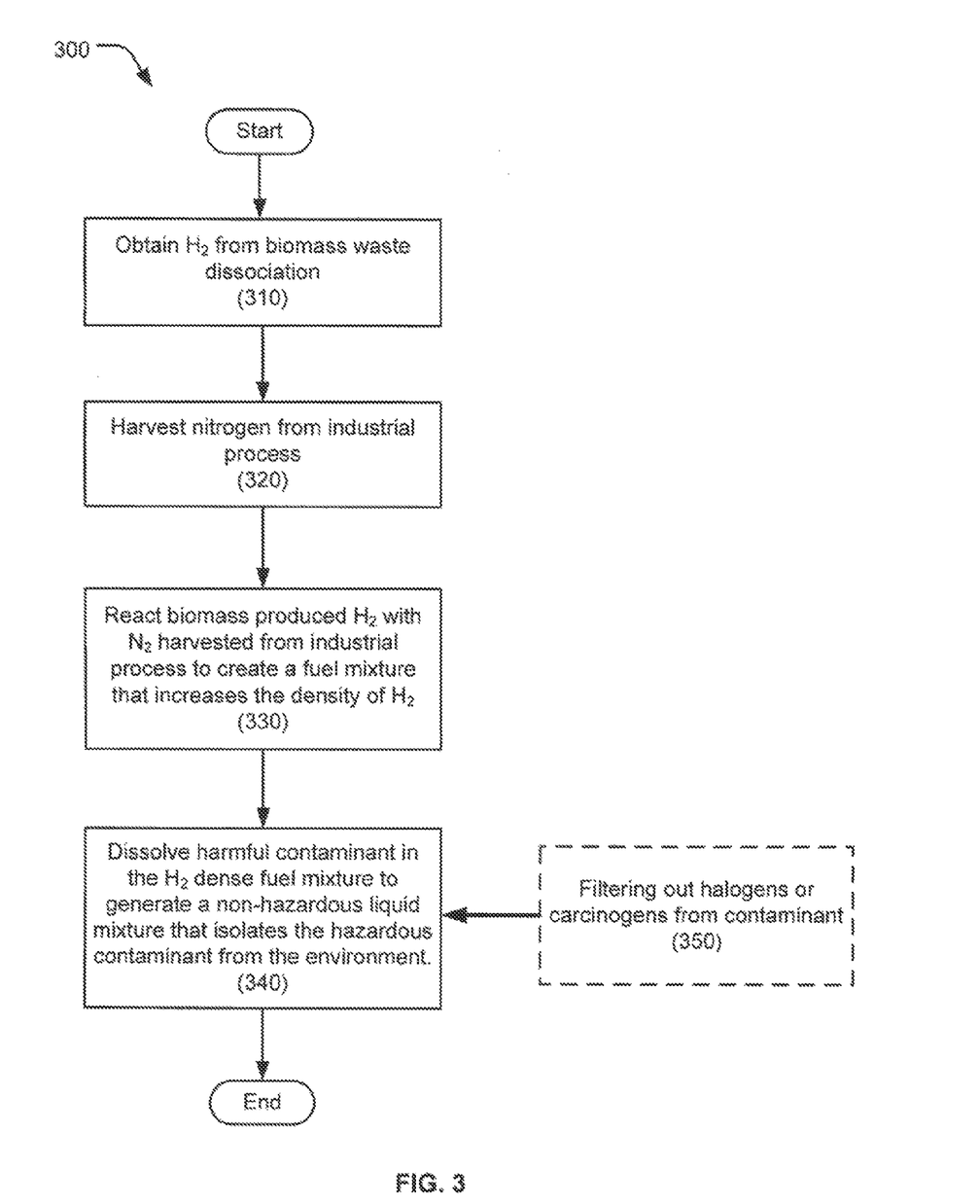
FIG. 3 shows a process flow diagram of an exemplary process for repurposing nitrogen from air or waste products to generate hydrogen-dense renewable fuel that can isolate and remove hazardous contaminants.

In addition to carbon donors, such as $CO_2$ harvested from contaminants, other organics, such as nitrogen from the air or from pollutants can be used to generate ammonia ($NH_3$) to densify hydrogen. FIG. 3 shows a process flow diagram of an exemplary process 300 for repurposing nitrogen from air or waste products to generate hydrogen-dense renewable fuel that can isolate and remove hazardous contaminants. A system (e.g., system 400 below) can obtain $H_2$ from products of biomass waste dissociation (310). As described above, low specific $H_2$ can be obtained as a result of dissociating hydrocarbons and/or alcohols produced from the biomass dissociation. Also, the system can harvest nitrogen from an industrial process or air (320). The harvested nitrogen can be part of the emitted pollution from central power plants, coking, and calcining operations that burn hydrocarbons, breweries, and bakeries. The low specific energy $H_2$ from biomass waste dissociation is reacted with the harvested nitrogen to generate a fuel mixture that increases the density of $H_2$ (330). Similar to Equation 12, ammonia can be used as a solvent to dissolve the harmful contaminant to generate a liquid mixture that isolates the hazardous contaminant from the environment (340). In some implementations, the system can filter out halogens and carcinogens from the hydrogen-dense fuel using above described techniques (350).

Repurposing or recycling of oxides of carbon such as carbon dioxide or carbon monoxide from air-burning processes generally poses the problem of separation or accommodation of nitrogen contamination. Another process variation for preparation of values from mixtures of reactive ionic species is provided by arc, corona, microwave, or radiative ionization. Mixtures of carbon monoxide including production by a reaction of carbon dioxide and a carbon donor, and hydrogen including production by the process of Equations 6 or 7, and such nitrogen can be reacted to produce $CH_3OH$ and $NH_3$ as shown in Equation 13.

$$CO+5H_2+N_2+ENERGY \rightarrow CH_3OH+2NH_3 \qquad \text{Equation 13}$$

Also, nitrogen separated from the exhaust of an engine can be used as a cover gas for autoclave processing and separated nitrogen can be reacted with hydrogen to form ammonia or a variety of compounds. In addition, various "nitrogen fixing" processes including synthesis of ammonia from nitrogen and pressurizing hydrogen along with synthesis of methanol ($CH_3OH$) from carbon monoxide and pressurizing hydrogen. Equation 14 shows the venerable process of ammonia formation.

$$3H_2+N_2 \rightarrow 2NH_3 \qquad \text{Equation 14}$$

Other sources of nitrogen can include power plants that use air to combust natural gas (NG) in Rankine cycle and combined cycles (e.g., combustion turbines sourcing heat for steam turbines), which have about 3-6% $CO_2$ in the flue emissions. The balance is nitrogen, water vapor and lower concentrations of various other greenhouse gases as shown in Equation 15.

$$CH_4+Air\ (0.8N_2+0.2O_2) \rightarrow N_2+CO_2+H_2O \qquad \text{Equation 15}$$

Coal fired Rankine-cycle power plants may have about 10-12% $CO_2$ in the flue emissions in addition to nitrogen. Equation 16 summarizes an approximate process for air and coal combustion that produces nitrogen and $CO_2$.

$$Coal+Air\ (0.8N_2+0.2O_2) \rightarrow N_2+CO_2 \qquad \text{Equation 16}$$

In addition, it is possible to use sulfur in the form of $H_2S$ and other sulfur compounds that are removed from the gas mixture (e.g., exhaust gas from industrial processes) in processes that provide valuable chemicals and fertilizers. For example, ammonium sulfate can be readily produced from such feed stocks using any suitable technology including the well known Saturator, Wilputte, Pickle Liquor or Indirect process. Oleum and/or sulfuric acid may also be produced from sulfur values in the delivered gas mixture. Similarly, other compounds such as ammonium chloride, ammonium bromide, ammonium iodide, ammonium nitrate, ammonium acetate, ammonium phosphate, and ammonium carbonates may be readily produced to meet market demand for such products.

Ammonia produced by these or other reactions that utilize hydrogen produced by the processes typical to Equations 6 or 7, can be safely stored and transported. This provides compact storage and may serve as a precursor of hydrogen. Ammonia can be stored in various ways including as a pressurized liquid, a salt such as ammonium chloride, or in activated media such as carbon and pressurization can be accomplished by heat addition. Decomposition of ammonia as it passes a catalyst may be utilized to pressurize the $N_2$ and $H_2$ products including pressurization of carbon monoxide and hydrogen that may be co-produced from methanol or wet methanol.

Pressurized ammonia can be distributed for various uses and ammonia may also be used as a fuel in an engine by direct injection through a fuel injector or a multi-fuel injector as described in U.S. Pat. No. 7,628,137 entitled "Multifuel Storage, Metering and Ignition System," the contents of which are incorporated by reference.

Small amounts of $NH_3$, $H_2S$, $N_2$, and $H_2O$ may also be found in the gaseous products with the CO and $H_2$ produced by biomass dissociation. $H_2S$ can be reacted with iron to form iron sulfide or collected in carbon produced by the process as hydrogen is released. Fixed nitrogen can be collected as ammonia and sulfur as iron sulfide and these substances can be use as soil nutrients along with ash collected.

Figure 4A:
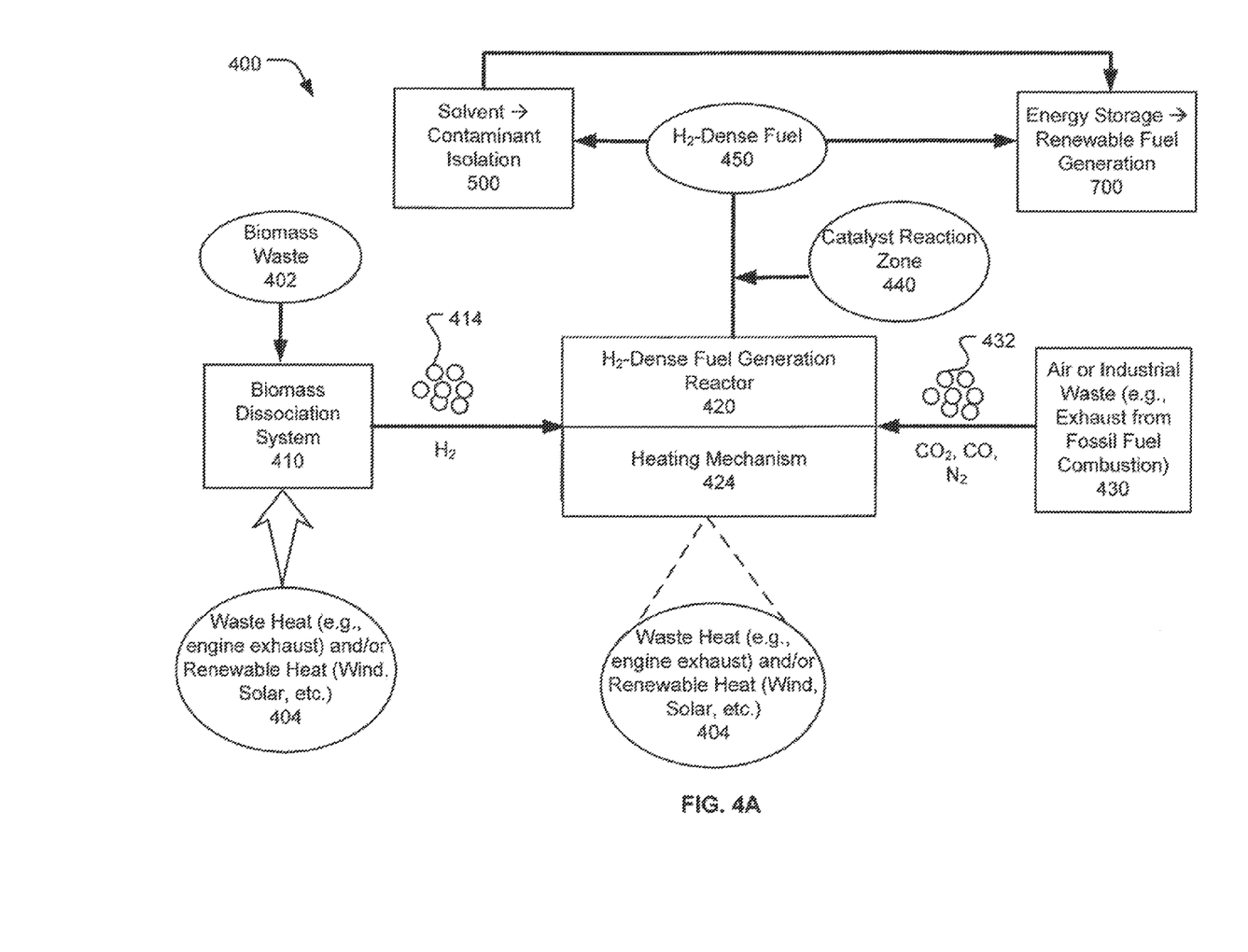
FIG. 4A is a block diagram showing an exemplary system for generating hydrogen-dense fuel by repurposing or recycling carbon donors and hydrogen donors harvested from industrial waste with low specific energy hydrogen generated from biomass dissociation.

FIG. 4A is a block diagram showing an exemplary system 400 for generating hydrogen-dense fuel by repurposing or recycling carbon donors and hydrogen donors harvested from industrial waste with low specific energy hydrogen generated from biomass dissociation. The system 400 includes a biomass dissociation system 410 that receives biomass waste 402 to be dissociated into carbon, hydrocarbons, alcohols, ammonia and hydrogen using a thermochemical regenerative process. The heat used to dissociate the biomass waste 402 can include waste heat 404 from engine exhausts, engine cooling system etc. that otherwise would be released to the environment. Also, one or more of renewable energy sources, such as wind, solar, etc. can be used to generate the heat.

From the biomass dissociation system 410, low specific energy hydrogen 414 (from dissociation of hydrocarbons, for example) is captured and forwarded to $H_2$-dense fuel generator 420, which includes a heating mechanism 424. The $H_2$-dense fuel generator 420 also receives carbon donors, hydrogen donors, or nitrogen or any combination of the three 432 harvested from industrial processes (e.g., exhaust gases from fossil fuel combustion or air). The $H_2$-dense fuel generator 420 reacts the low specific energy $H_2$ with the harvested carbon donors, hydrogen donors, or nitrogen or any combination of the three 432 to generate $H_2$-dense fuel 450, such as methanol. The harvested carbon donors, hydrogen donors, or nitrogen or any combination of the three 432 can be obtained from air or industrial waste (e.g., exhaust from fossil fuel combustion) 430.

The system 400 can include a catalyst reaction zone 440 to receive one or more catalysts that enhances the generation of the $H_2$-dense fuel. Examples of catalysts are describe above.

The generated $H_2$-dense fuel 450 is storable and transportable. Because the $H_2$-dense fuel 450 carry $H_2$ fuel in a transportable form, the $H_2$-dense fuel operates as a vehicle for carry energy to a desired destination. The $H_2$-dense fuel 450 can be dissociated to obtain $H_2$ fuel and oxygenated fuel using a renewable fuel generation system 600.

In addition, the $H_2$-dense fuel 450 can be sent to a contaminant isolation system 500 for dissolving and isolating hazardous contaminants that include carbon donors, hydrogen donors or both as described above. By dissolving the hazardous contaminants, such as $CO_2$, release of harmful contaminants into the environment can be prevented or reduced. When the hazardous contaminants are dissolved in the $H_2$-dense fuel 450 operating as a solvent, the resulting liquid mixture is environmentally safe. Moreover, the liquid mixture, which isolated and removed the hazardous contaminants, can be dissociated (e.g., by the renewable fuel generation system 600) to obtain renewable energy that is dense in hydrogen.

Figure 4B:
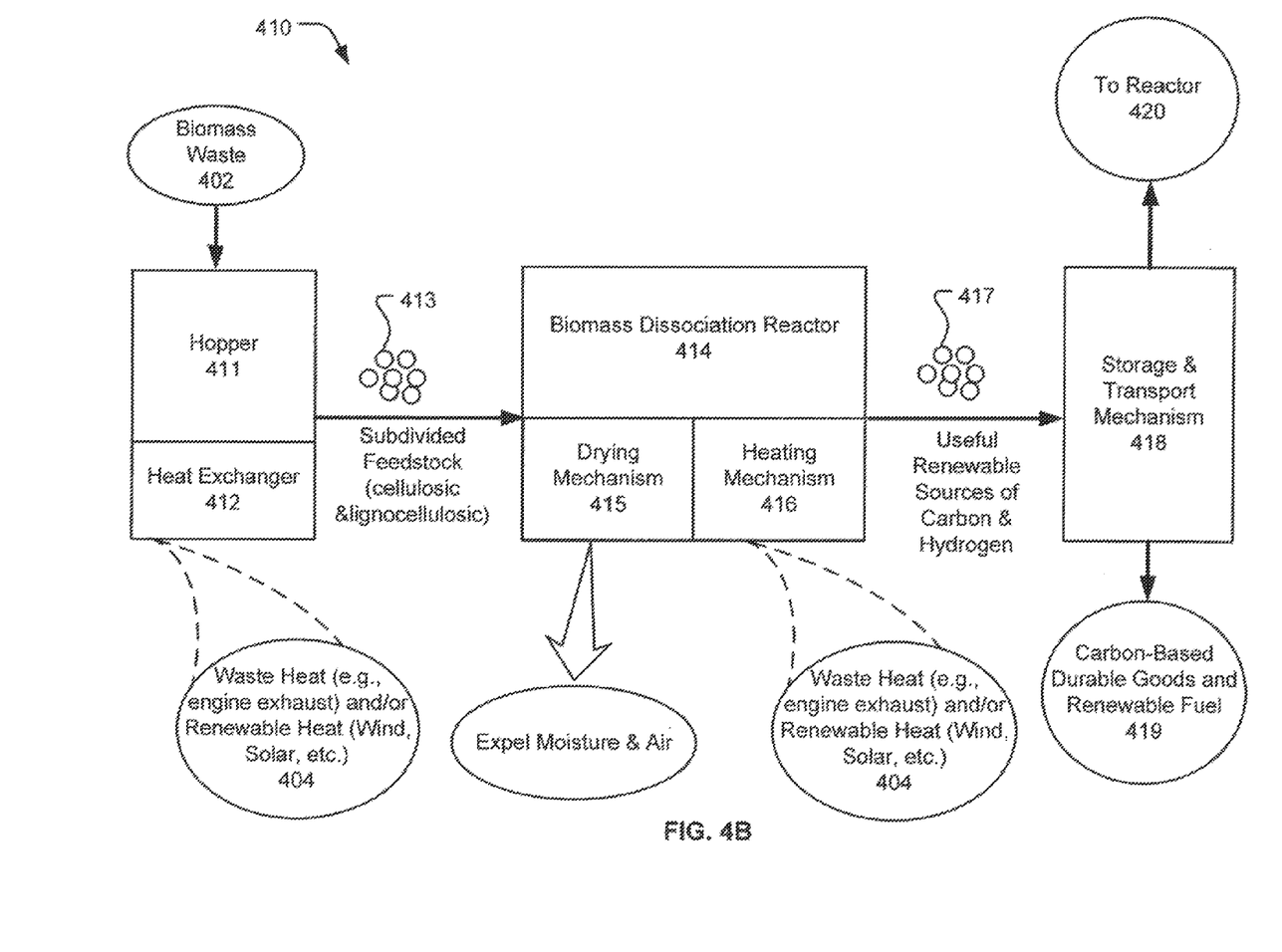
FIG. 4B is a block diagram showing an exemplary system for dissociating biomass waste into hydrogen and carbon carrying intermediaries.

FIG. 4B is a block diagram showing an exemplary system 410 for dissociating biomass waste into hydrogen and carbon carrying intermediaries. The system 410 includes a biomass waste intake component, such as a hopper 411 that receives the biomass waste 402 in raw form and breaks down (e.g., chips, chops, grinds, etc.) the raw material into subdivided feedstock, such as various cellulosic and lignocellulosic materials. The hopper 411 can include a heating mechanism, such as a heat exchanger 412 to pre-heat the subdivided feedstock. The heat exchanger can recapture and recycle waste heat from an external heat source (e.g., engine exhaust and/or renewable heat, such as wind, solar, etc.) or from biomass dissociation reactor 414 itself.

The subdivided (and in some implementations, pre-heated) feedstock 413 is forwarded to a biomass dissociation reactor 414 to dissociate the biomass waste feedstock into useful renewable sources of carbon and hydrogen, such as various hydrocarbons, alcohols, ammonia, and oxides of carbon. The reactor can include a drying mechanism 415 to expel moisture and air from the feedstock. The drying mechanism 415 can include an extruding device to physically 'squeeze out' the moisture and air from the feedstock. Examples of the extruding device include a helical screw conveyer and a ram piston conveyer. Also, the drying mechanism 415 can include one or more heating mechanisms, such as heat exchangers that capture heat generated by the reactor 414 and recycle the captured heat to dry the feedstock. The heat exchangers can also recapture and recycle waste heat from an external heat source (e.g., engine exhaust and/or renewable heat, such as wind, solar, etc.)

The reactor 414 can also include a heating mechanism 416 for generating adequate heat used in an anaerobic reaction to dissociate the biomass waste feedstock into the useful renewable sources of carbon and hydrogen 417, such as hydrocarbons, alcohols, ammonia and oxides of carbon. The generated useful renewable sources of carbon and hydrogen 417 can be forwarded to a storage and/or transport mechanism 418 to be used by the H2-dense fuel generation reactor 420 and in additional reactions to generate renewable fuel and/or carbon-based durable goods 419 as described in the copending U.S. patent application entitled "Carbon-Based Durable Goods and Renewable Fuel from Biomass Waste Dissociation," the entire contents of which is incorporated by reference. Moreover, the storage and/or transport mechanism 418 allows for efficient transport of the useful renewable sources of carbon and hydrogen 417 to remote locations for further processing.

The biomass dissociation reactor 414 can be configured to increase the thermal efficiency of the biomass waste conversion process while reducing or eliminating carbon dioxide formation. For example, the biomass dissociation reactor 414 can include mechanisms to perform various countercurrent drying (e.g., recycling heat) and elimination of air, moisture, and other oxygen donors prior to extraction of carbon, hydrocarbons such as methane, and/or hydrogen.

Figure 5:
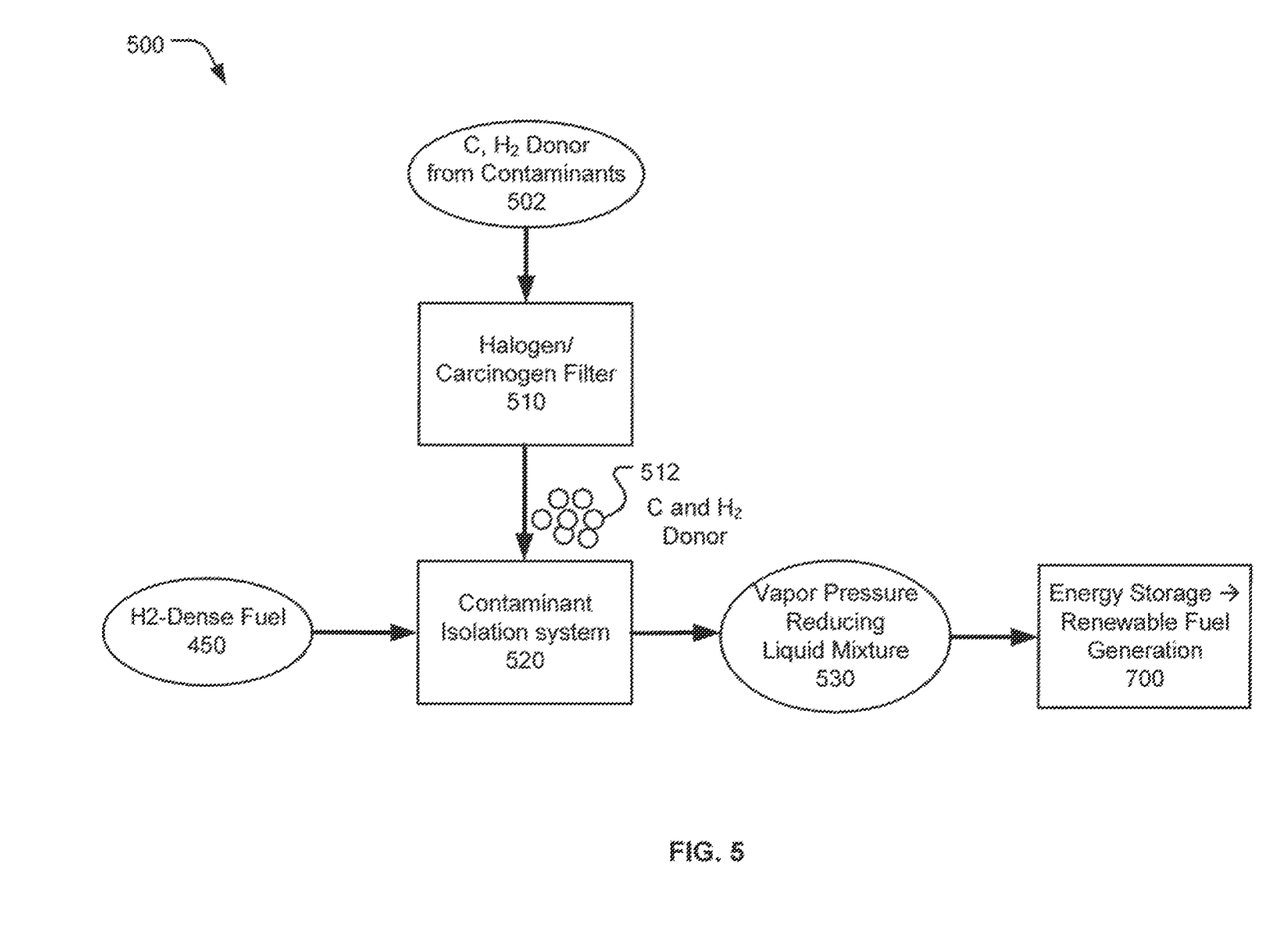
FIG. 5 is a block diagram showing an exemplary system for using the H2-dense fuel as a solvent to dissolve harmful contaminants to obtain a liquid mixture that isolates the harmful effects of the contaminants from the environment.

FIG. 5 is a block diagram showing an exemplary system 500 for using the $H_2$-dense fuel as a solvent to dissolve harmful contaminants to obtain a non-hazardous mixture that isolates the harmful effects of the contaminants from the environment. The system 500 receives the $H_2$-dense fuel 450 along with the hazardous contaminants as described above with respect to Equation 12. The contaminants can include a carbon donor, a hydrogen donor or both, such as colloidal carbons. The system 500 includes a contaminant isolation system 520 that dissolves the contaminants in the $H_2$-dense fuel 450 to generate a liquid mixture 530 that isolates the harmful effects of the contaminants from the environment.

The system 500 can include a filter 510 to take out any halogens or carcinogens from the contaminants 502 to provide the carbon donor or carbon and hydrogen donors 512 in the contaminants to the contaminant isolation system 520. The techniques for filtering out halogens or carcinogens as harmless salts, etc. are described above with respect to FIGS. 2-3. The liquid mixture can be forwarded (e.g., pipeline transportation) to a storage container or a renewable fuel generating system (e.g., system 700) to generate renewable fuel, such as high specific energy hydrogen.

Hydrogen Dense Fuel for Storing Energy

The hydrogen-dense fuels produced using processes described in Equations 10 and 11 above provide a bridge technology for increasing the financial return on past investments in equipment by utilizing existing transportation engines and storage tanks to enable thermochemical regeneration of such fuels as summarized in Equation 15 to produce hydrogen-characterized fuels for achieving longer engine life and greater fuel efficiency along with greatly reduced emissions of carbon dioxide, hydrocarbons, oxides of nitrogen and particulates.

$$CH_3OH + HEAT \rightarrow CO + 2H_2 \qquad \text{Equation 15}$$

The heat used in the process of Equation 15 can be obtained by investing heat rejected from a heat engine to thermochemically reform methanol into carbon monoxide and hydrogen. Additionally, the heat used in the process of Equation 15 can be generated from renewable resources, such as wind and solar energy generators.

Similarly, the non-hazardous fuel mixture generated by adding a soluble organic contaminant to a hydrogen-dense fuel can be dissociated in an endothermic reaction to generate hydrogen-dense fuel using the reaction process of Equation 12 reproduced below.

$$CH_3OH + H_2O + C + HEAT \rightarrow 2CO + 3H_2 \qquad \text{Equation 12}$$

The economics of producing hydrogen fuel as shown in Equations 12 and 15 are more favorable when compared to burning methane as a fuel as shown in Equation 16 below.

$$CH_4 + 2O_2 \rightarrow CO_2 + 2H_2O + HEAT_{10} \qquad \text{Equation 16}$$

For example, the heat of reaction of methane at constant pressure of Equation 15 is approximately −344,940 BTU/Mole. But for three moles of hydrogen it is 3(−103,968 BTU/Mole)=−311,904 BTU; and 2(−121,666 BTU/Mole)=−243,332 for combusting 2CO in Equation 12 for a total yield of −555,236 BTU. This is the lower heating value without any credit for the heat of condensation of 3 moles of water. Compared to Equation 15 (yielding −344,940) it yields −210,296 BTU more energy than burning the initial feedstock methane directly. Thus, about 60% more combustion energy is delivered for production of work by the engine. Thermochemical regeneration does not require the new fuel species to be used at elevated temperature and the new species can regeneratively transfer heat to the thermochemical process for additional advantages in the techniques described herein.

Thus, depending upon the loading of soluble organics in the wet methanol, 25% to 60% more heat can be delivered to the combustion chamber and can be utilized more efficiently by a fuel injector as multi stacks of stratified combustants to combust more rapidly and eliminate particulates and oxides of nitrogen by adaptively controlled timing of the initial fuel injection and ignition, timing of each subsequent fuel injection and ignition and the fuel pressure of each fuel injection. A fuel injector or multi-fuel injector is described in U.S. Pat. No. 7,628,137 entitled "Multifuel Storage, Metering and Ignition System," the contents of which are incorporated by reference.

In addition, hydrogen and hydrogen donors such as $NH_3$ may be similarly stored in activated carbon and other host substances for the purpose of later release under conditions that control the degree of allowed expansion to produce the pressure desired. For example, multi-fuel injectors (as described in U.S. Pat. No. 7,628,137 entitled "Multifuel Storage, Metering and Ignition System," the contents of which are incorporated by reference) can provide for flow of much greater volumes of "fuel" that may include considerable amounts of non-fuel constituents and enable low-cost pressurization of the process shown in Equation 10 by release from adsorbed or absorbed storage and or by dissociation of ammonia as shown in illustrative Equations 17, 18 and 19.

$$2NH_3 \rightarrow 3H_2 + N_2 \qquad \text{Equation 17}$$

$$CO + 3H_2 + N_2 \rightarrow CH_3OH + H_2 + N_2 \qquad \text{Equation 18}$$

$$CO_2 + 3H_2 + N_2 \rightarrow CH_3OH + H_2O + N_2 \qquad \text{Equation 19}$$

Figure 6:
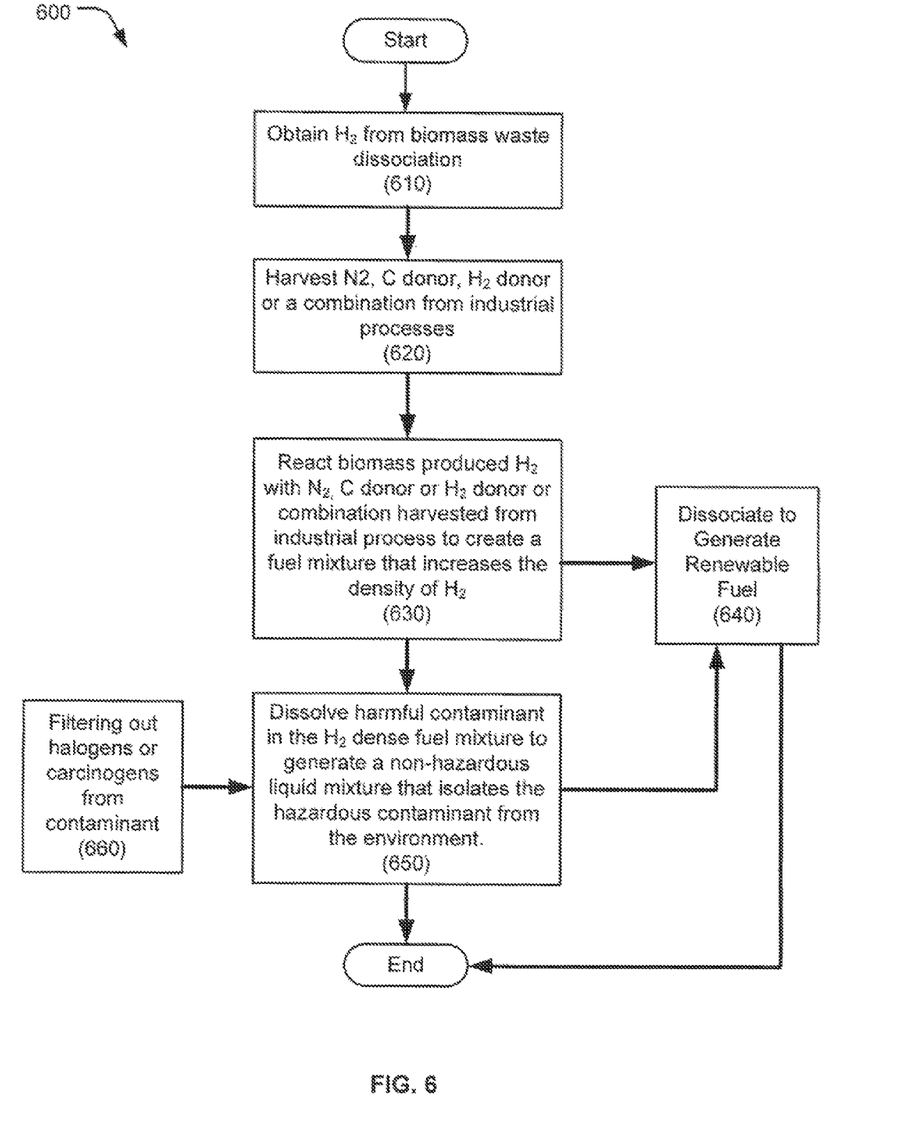
FIG. 6 is process flow diagram of an exemplary process for generating multi-purpose $H_2$-dense fuel for isolating hazardous contaminants and for storing energy as described above.

FIG. 6 is process flow diagram of an exemplary process 600 for generating multi-purpose $H_2$-dense fuel for isolating hazardous contaminants and for storing energy as described above. A system (e.g., system 700 below) can obtain $H_2$ from biomass waste dissociation (610). The system can harvest $N_2$, C donor, $H_2$ donor or a combination of these from industrial processes (620). The system reacts the biomass produced $H_2$ with the $N_2$, C donor or $H_2$ donor or combination of these harvested from the industrial processes to create a fuel mixture that increases the density of $H_2$ (630). $H_2$-dense fuel mixture can be dissociated under an endothermic reaction (e.g., by applying appropriate heat) to generate renewable fuel, such as methanol (640).

The system can use the $H_2$-dense fuel mixture as a solvent to dissolve harmful contaminants to generate a liquid mixture that isolates the hazardous contaminant from the environment (650). The system can filter out any halogens or carcinogens from the contaminants (660).

Figure 7:
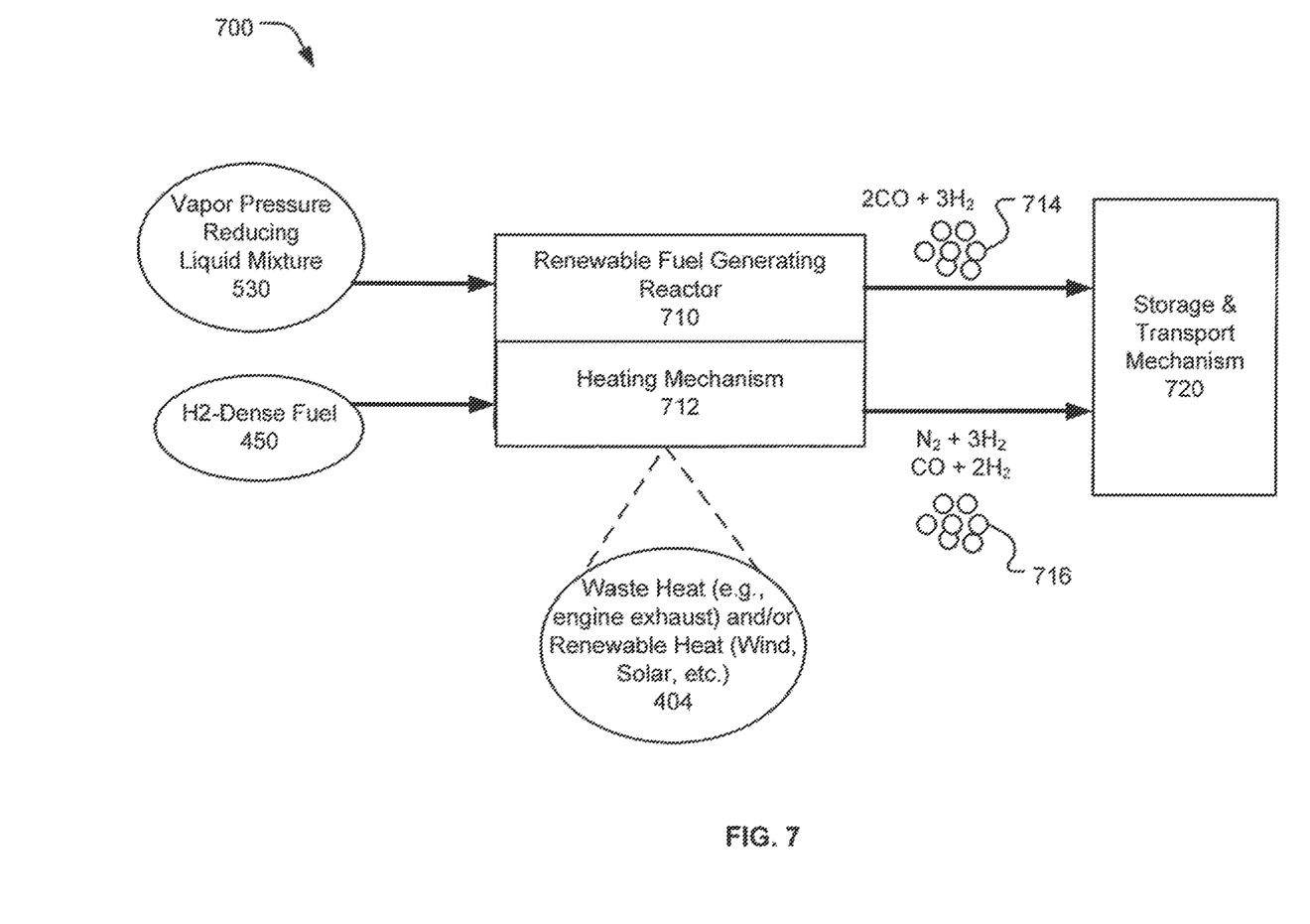
FIG. 7 is a block diagram showing an exemplary system for generating multi-purpose $H_2$-dense fuel for isolating hazardous contaminants and for storing energy as described above.

FIG. 7 is a block diagram showing an exemplary system 700 for generating multi-purpose $H_2$-dense fuel for isolating hazardous contaminants and for storing energy as described above. The system 700 includes a renewable fuel generating reactor 710 that receives the $H_2$-dense fuel generated as described above. The reactor 710 can also receive the liquid mixture that isolated the hazardous contaminants. The reactor 710 can include a heating mechanism 712 to apply heat necessary to covert the $H_2$-dense fuel 450 and the liquid mixture 530 that isolated the hazardous contaminants into renewable fuel.

For example, the $H_2$-dense fuel 450 can be dissociated to generate $N_2$, $H_2$, CO or a combination (716). The liquid mixture 530 can be dissociated to generate CO and $H_2$ (714). The heat used in the reaction can be obtained from waste heat 404 from engine exhaust or cooling system that otherwise would be released to the environment. Also, heat from one or more renewable resources, such as wind, solar, running water, geothermal, etc. can be used in the reaction. The generated fuel 714 and 716 can be stored and or transported using a storage and transport mechanism 720, such as a pressurized container and/or pipelines.

Architectural Constructs as Sources of Hydrogen and Colloidal Carbon

To enhance the generation of hydrogen dense fuel for use as solvents for dissolving contaminants or for storing energy, architectural constructs can be engineered to exhibit useful properties, such as the ability to be pre-loaded with hydrogen in various forms and colloidal carbon. An architectural construct can include a synthetic matrix of various elementary unit cells including crystals. The matrix of crystals can include various materials, such as graphene, graphite, boron nitride, or another material. Also, the hydrogen (and/or colloidal carbon) preloaded architectural constructs can be implemented as a solid mass, as layers that are as thin as an atom, or in other arrangements and variations.

By preloading the architectural constructs to be packed with hydrogen (or hydrogen-dense materials) and/or colloidal carbon, the above described processes for generating the hydrogen-dense fuel can be enhanced or accelerated to increase the hydrogen density. Enhancing the generation of the hydrogen-dense fuel similarly enhances or improves the use of the hydrogen-dense fuel as solvents for dissociating harmful contaminants. In addition, the hydrogen-dense fuel can be dissociated to produce hydrogen fuel with a higher ratio of hydrogen to carbon.

As described herein, carbon and hydrogen from biomass waste and pollutants can be recycled and reused to generate a multi-purpose H2-dense fuel that can be used as a solvent to isolate harmful contaminants and to store energy. The harmful contaminants not only are isolated from the environment but also increase the density of hydrogen in a resultant non-hazardous mixture. Using the techniques and system described above, release of carbon and other harmful contaminants are reduced and at the same time renewable fuel is generated.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Only a few implementations and examples are described and other implementations, enhancements and variations can be made based on what is described and illustrated in this application.

To the extent not previously incorporated herein by reference, the present application incorporates by reference in their entirety the subject matter of each of the following materials: Ser. No. 13/027,208, filed on Feb. 14, 2011 and titled CHEMICAL PROCESSES AND REACTORS FOR EFFICIENTLY PRODUCING HYDROGEN FUELS AND STRUCTURAL MATERIALS, AND ASSOCIATED SYSTEMS AND METHODS; Ser. No. 13/026,996, filed on Feb. 14, 2011 and titled REACTOR VESSELS WITH TRANSMISSIVE SURFACES FOR PRODUCING HYDROGEN-BASED FUELS AND STRUCTURAL ELEMENTS, AND ASSOCIATED SYSTEMS AND METHODS; Ser. No. 13/027,015, filed on Feb. 14, 2011 and titled CHEMICAL REACTORS WITH RE-RADIATING SURFACES AND ASSOCIATED SYSTEMS AND METHODS; Ser. No. 13/027,244, filed on Feb. 14, 2011 and titled THERMAL TRANSFER DEVICE AND ASSOCIATED SYSTEMS AND METHODS; Ser. No. 13/026,990, filed on Feb. 14, 2011 and titled CHEMICAL REACTORS WITH ANNULARLY POSITIONED DELIVERY AND REMOVAL DEVICES, AND ASSOCIATED SYSTEMS AND METHODS; Ser. No. 13/027,181, filed on Feb. 14, 2011 and titled REACTORS FOR CONDUCTING THERMOCHEMICAL PROCESSES WITH SOLAR HEAT INPUT, AND ASSOCIATED SYSTEMS AND METHODS; Ser. No. 13/027,215, filed on Feb. 14, 2011 and titled INDUCTION FOR THERMOCHEMICAL PROCESS, AND ASSOCIATED SYSTEMS AND METHODS; Ser. No. 13/027,198, filed on Feb. 14, 2011 and titled COUPLED THERMOCHEMICAL REACTORS AND ENGINES, AND ASSOCIATED SYSTEMS AND METHODS; U.S. Patent Application No. 61/385,508, filed on Sep. 22, 2010 and titled REDUCING AND HARVESTING DRAG ENERGY ON MOBILE ENGINES USING THERMAL CHEMICAL REGENERATION; Ser. No. 13/027,060, filed on Feb. 14, 2011 and titled REACTOR VESSELS WITH PRESSURE AND HEAT TRANSFER FEATURES FOR PRODUCING HYDROGEN-BASED FUELS AND STRUCTURAL ELEMENTS, AND ASSOCIATED SYSTEMS AND METHODS; U.S. Patent Application No. 61/237,419, filed on Aug. 27, 2009 and titled CARBON SEQUESTRATION; Ser. No. 13/027,068, filed on Feb. 14, 2011 and titled SYSTEM FOR PROCESSING BIOMASS INTO HYDROCARBONS, ALCOHOL VAPORS, HYDROGEN, CARBON, ETC.; Ser. No. 13/027,196, filed on Feb. 14, 2011 and titled CARBON RECYCLING AND REINVESTMENT USING THERMOCHEMICAL REGENERATION; Ser. No. 13/027,195, filed on Feb. 14, 2011 and titled OXYGENATED FUEL; U.S. Patent Application No. 61/237,425, filed on Aug. 27, 2009 and titled OXYGENATED FUEL PRODUCTION; and Ser. No. 13/027,185, filed on Feb. 14, 2011 and titled ENGINEERED FUEL STORAGE, RESPECIATION AND TRANSPORT.

What is claimed is:

1. An energy-dense liquid mixture that reduces vapor pressure or availability of vapor pressure of a previously hazardous contaminant, the liquid mixture produced by a method comprising:

dissociating biomass waste using an aerobic reaction to produce hydrogen and at least one of hydrocarbon and alcohol by applying waste heat recovered from an external heat source;

dissociating the at least one of hydrocarbon and alcohol to generate carbon and hydrogen;

harvesting carbon dioxide emitted from an industrial process;

reacting the harvested carbon dioxide with hydrogen from dissociating the biomass waste and from dissociating the at least one of hydrocarbon and alcohol to generate a hydrogen-dense fuel; and dissolving a hazardous contaminant in the hydrogen-dense fuel with the hydrogen-dense fuel operating as a solvent, the hazardous contaminant comprising at least one of a carbon donor and a hydrogen donor.

2. The energy-dense liquid mixture of claim 1, wherein dissociating the biomass waste comprises producing one or more carbon donors in addition to the hydrogen and at least one of hydrocarbon and alcohol.

3. The energy-dense liquid mixture of claim 2, wherein the method comprises reacting the one or more carbon donors with the hydrogen produced from the biomass waste to generate hydrogen-dense alcohol.

4. The energy-dense liquid mixture of claim 3, wherein the method comprises reacting the one or more carbon donors with water to generate additional alcohol.

5. The energy-dense liquid mixture of claim 1, wherein the hydrocarbon comprises methane, and the alcohol comprises methanol.

6. The energy-dense liquid mixture of claim 1, wherein the method further comprises filtering at least one of a halogen and a carcinogen from the hazardous contaminant.

7. An energy-dense liquid mixture that reduces vapor pressure or availability of vapor pressure of a previously hazardous contaminant, the liquid mixture produced by a method comprising:
dissociating biomass waste using an aerobic reaction to produce at least one of hydrocarbon and alcohol by applying waste heat recovered from an external heat source;
dissociating the at least one of hydrocarbon and alcohol to generate carbon and hydrogen;
harvesting carbon dioxide emitted from an industrial process;
reacting the harvested carbon dioxide with the hydrogen to generate a hydrogen-dense fuel; and
dissolving a hazardous contaminant in the hydrogen-dense fuel with the hydrogen-dense fuel operating as a solvent, the hazardous contaminant comprising at least one of colloidal carbon, fat, carbohydrate, sugar, rejected waste material from a polymer plant, carbon dioxide from exhaust of an industrial process, dust from coal, dust from grain, dust from polymer processing, and distilled solids from ethanol plant waste stream.

8. The energy-dense liquid mixture of claim 7, wherein dissociating the biomass waste comprises producing hydrogen in addition to the at least one of hydrocarbon and alcohol.

9. The energy-dense liquid mixture of claim 8, wherein dissociating the biomass waste comprises producing one or more carbon donors in addition to the hydrogen and at least one of hydrocarbon and alcohol.

10. The energy-dense liquid mixture of claim 9, wherein the method comprises reacting the one or more carbon donors with the hydrogen produced from the biomass waste to generate hydrogen-dense alcohol.

11. The energy-dense liquid mixture of claim 10, wherein the method comprises reacting the one or more carbon donors with water to generate additional alcohol.

12. The energy-dense liquid mixture of claim 7, wherein the hydrocarbon comprises methane, and the alcohol comprises methanol.

13. The energy-dense liquid mixture of claim 7, wherein the method further comprises filtering at least one of a halogen and a carcinogen from the hazardous contaminant.

14. An energy-dense liquid mixture that reduces vapor pressure or availability of vapor pressure of a previously hazardous contaminant, the liquid mixture produced by a method comprising:
dissociating biomass waste using an aerobic reaction to produce at least one of hydrocarbon and alcohol by applying waste heat recovered from an external heat source;
dissociating the at least one of hydrocarbon and alcohol to generate carbon and hydrogen;
harvesting carbon dioxide emitted from an industrial process;
reacting the harvested carbon dioxide with the hydrogen to generate a hydrogen-dense fuel;
filtering at least one of a halogen and a carcinogen from a hazardous contaminant; and
dissolving the hazardous contaminant in the hydrogen-dense fuel with the hydrogen-dense fuel operating as a solvent, the hazardous contaminant comprising at least one of a carbon donor and a hydrogen donor.

15. The energy-dense liquid mixture of claim 14, wherein dissociating the biomass waste comprises producing hydrogen in addition to the at least one of hydrocarbon and alcohol.

16. The energy-dense liquid mixture of claim 15, wherein dissociating the biomass waste comprises producing one or more carbon donors in addition to the hydrogen and at least one of hydrocarbon and alcohol.

17. The energy-dense liquid mixture of claim 16, wherein the method comprises reacting the one or more carbon donors with the hydrogen produced from the biomass waste to generate hydrogen-dense alcohol.

18. The energy-dense liquid mixture of claim 17, wherein the method comprises reacting the one or more carbon donors with water to generate additional alcohol.

19. The energy-dense liquid mixture of claim 14, wherein the hydrocarbon comprises methane, and the alcohol comprises methanol.

20. The energy-dense liquid mixture of claim 14, wherein the hazardous contaminant comprises at least one of colloidal carbon, fat, carbohydrate, sugar, rejected waste material from a polymer plant, carbon dioxide from exhaust of an industrial process, dust from coal, dust from grain, dust from polymer processing, and distilled solids from ethanol plant waste stream.

* * * * *